(12) United States Patent
Baker

(10) Patent No.: US 10,932,447 B2
(45) Date of Patent: Mar. 2, 2021

(54) ANIMAL TOY

(71) Applicant: Doskocil Manufacturing Company, Inc., Arlington, TX (US)

(72) Inventor: Nicholas Baker, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 581 days.

(21) Appl. No.: 15/798,755

(22) Filed: Oct. 31, 2017

(65) Prior Publication Data
US 2019/0021286 A1 Jan. 24, 2019

Related U.S. Application Data

(60) Provisional application No. 62/535,026, filed on Jul. 20, 2017.

(51) Int. Cl.
*A01K 15/02* (2006.01)
*A01K 5/01* (2006.01)

(52) U.S. Cl.
CPC .......... *A01K 15/025* (2013.01); *A01K 5/0114* (2013.01)

(58) Field of Classification Search
CPC ... A01K 15/025; A01K 15/026; A01K 5/0114
USPC ...................... 119/707, 709, 710, 711, 51.01
See application file for complete search history.

(56) References Cited

U.S. PATENT DOCUMENTS

| 2,086,631 | A | * | 7/1937 | Munro | ................... | A63H 33/00 |
| | | | | | | 119/711 |
| 8,474,404 | B2 | * | 7/2013 | Costello | ............... | A01K 15/025 |
| | | | | | | 119/51.01 |
| 8,820,268 | B2 | * | 9/2014 | Valle | ..................... | A01K 15/025 |
| | | | | | | 119/710 |
| 2008/0083378 | A1 | * | 4/2008 | Pearce | ................. | A01K 5/0114 |
| | | | | | | 119/707 |

* cited by examiner

*Primary Examiner* — Christopher D Hutchens
*Assistant Examiner* — Steven J Shur
(74) *Attorney, Agent, or Firm* — Global IP Counselors, LLP

(57) ABSTRACT

An animal toy includes a generally spherical center portion having an opening, a slidable door configured to close the opening, and a plurality of flexible legs. The slidable door is configured to frictionally fit within open such that the door is capable of being in an open position, a closed position and a partially opened position. Each of the plurality legs includes an arcuate portion so as to at least partially surround the generally spherical center portion.

17 Claims, 8 Drawing Sheets

ANIMAL TOY

CROSS-REFERENCE TO RELATED APPLICATION

This application claims priority to U.S. Provisional Patent Application No. 62/535,026, filed Jul. 20, 2017, the contents of which are hereby incorporated herein by reference.

BACKGROUND

Field of Invention

The present invention relates to an animal toy. In particular, the present invention relates to an animal toy that has a center portion configured to hold an object and has a variable positionable door that can increase the usable time for an animal.

Background to the Invention

Toys that dispense animal treats when the toy is rolled or otherwise manipulated are generally known in the relevant art. Such devices have a variety of forms and arrangements of holes and openings. These treat-discharging toys can be challenging and are designed to retain the treats within the toy until the toy is played with by the pet. The challenge feature could be, for example, an obstructed interior between the first and one or more openings that causes a treat to rattle around in response to movement of the toy from the pet. Another challenge feature could, for example, hold the treat in one location that is only accessible if the pet chews or licks the toy.

Despite the advancements in the art, there is always a need for a treat dispenser which sustains a pet's attention for longer periods of time to entice the pet to play and maintain prolonged engagement and interest in the toy. Many pets have a relatively short attention span and are easily bored.

SUMMARY

It is desirable to provide an improved treat dispenser in view of the shortcomings in the relevant art. It has been discovered that to prolong engagement and interest in the toy an improved animal toy would be desired. In view of the state of the known technology, one aspect of the present disclosure is to provide an animal toy comprising a generally spherical center portion having an opening, a slidable door configured to close the opening, and a plurality of flexible legs. The slidable door is configured to frictionally fit within open such that the door is capable of being in an open position, a closed position and a partially opened position. Each of the plurality legs includes an arcuate portion so as to at least partially surround the generally spherical center portion.

BRIEF DESCRIPTION OF THE DRAWINGS

Referring now to the attached drawings which form a part of this original disclosure.

DETAILED DESCRIPTION OF THE EMBODIMENTS

Figure 1:
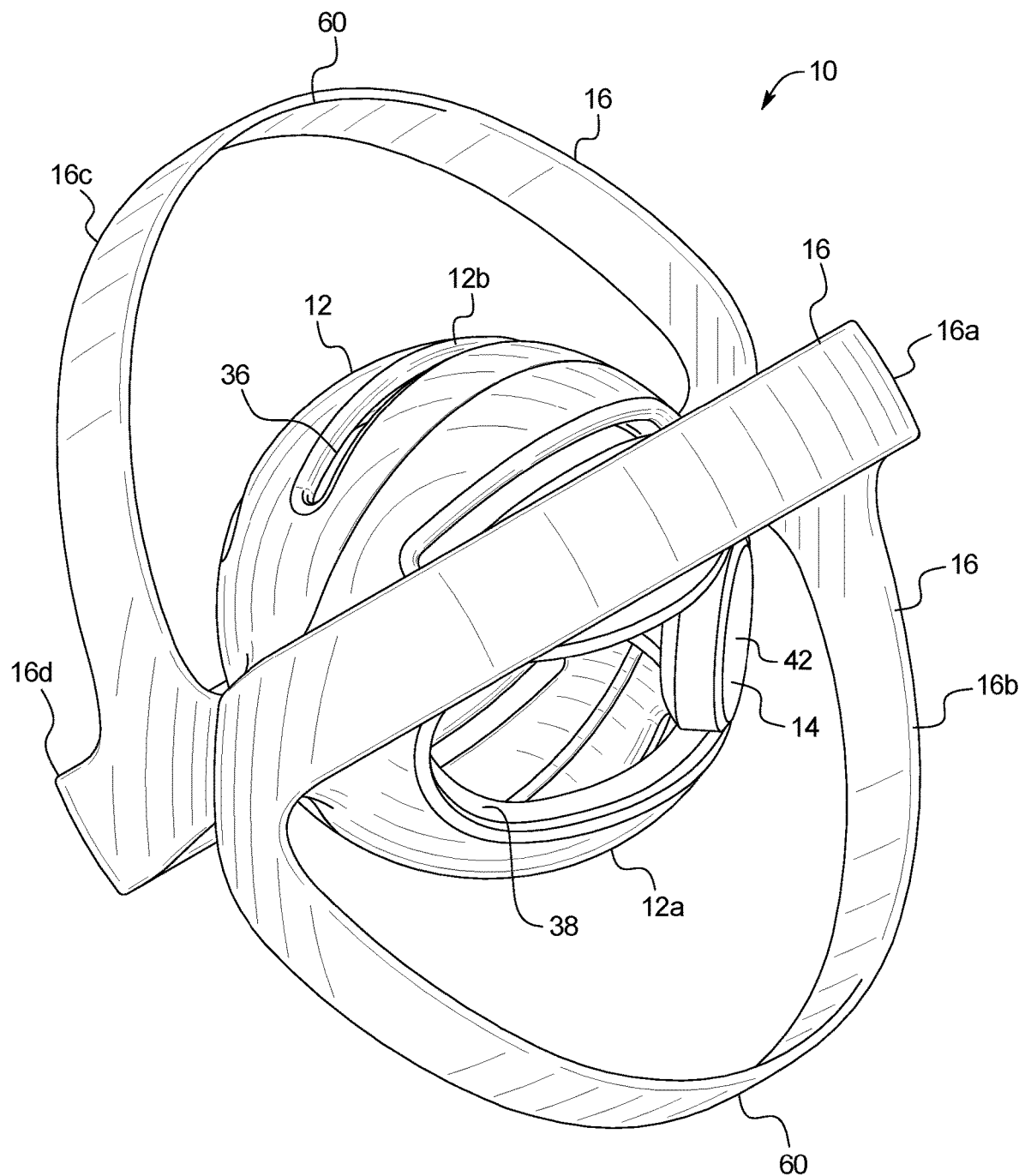
FIG. 1 is a front perspective view of an animal toy according to one embodiment of the present invention.
Figure 2:
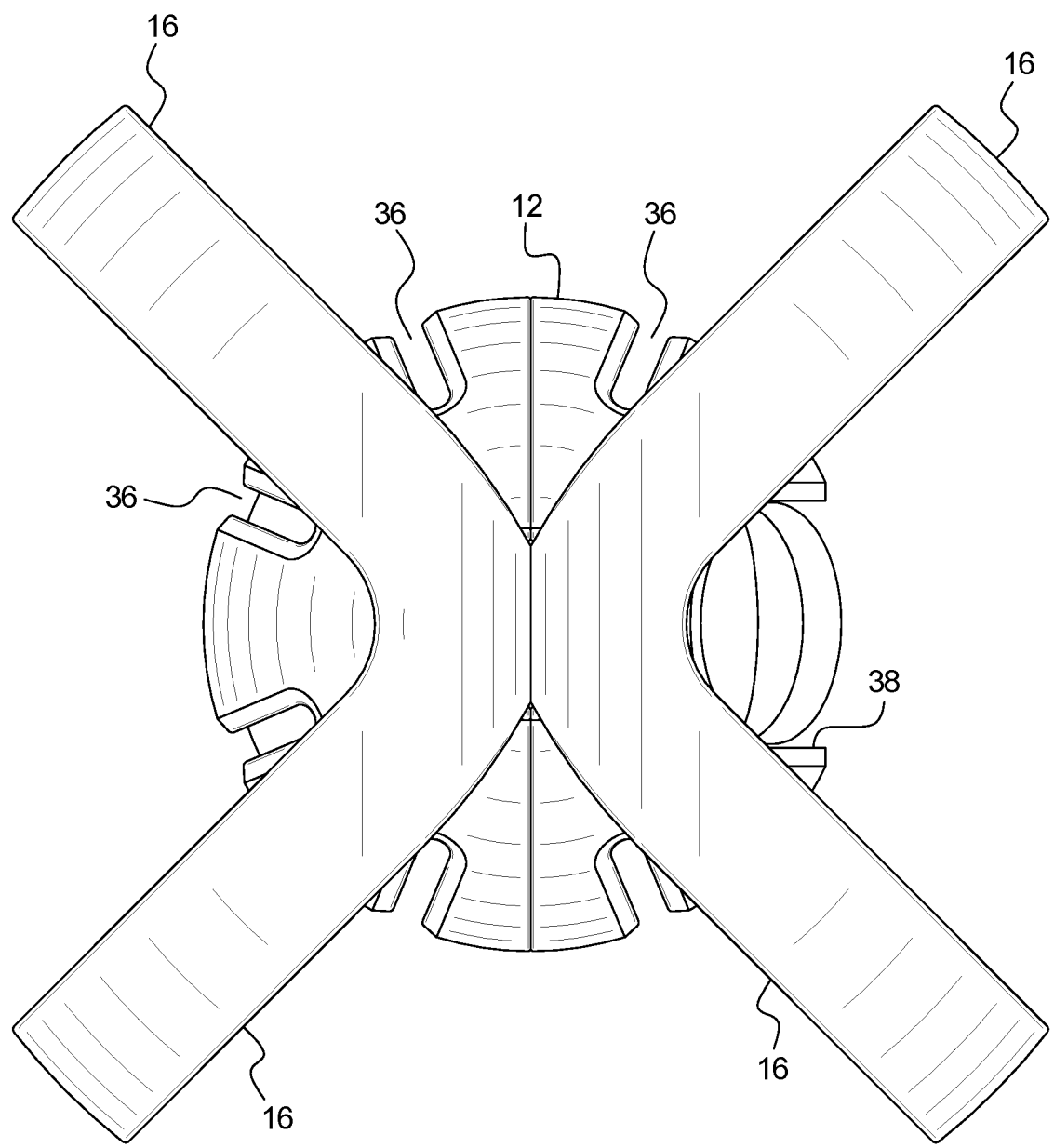
FIG. 2 is a front view of the of the animal toy of FIG. 1.
Figure 3:
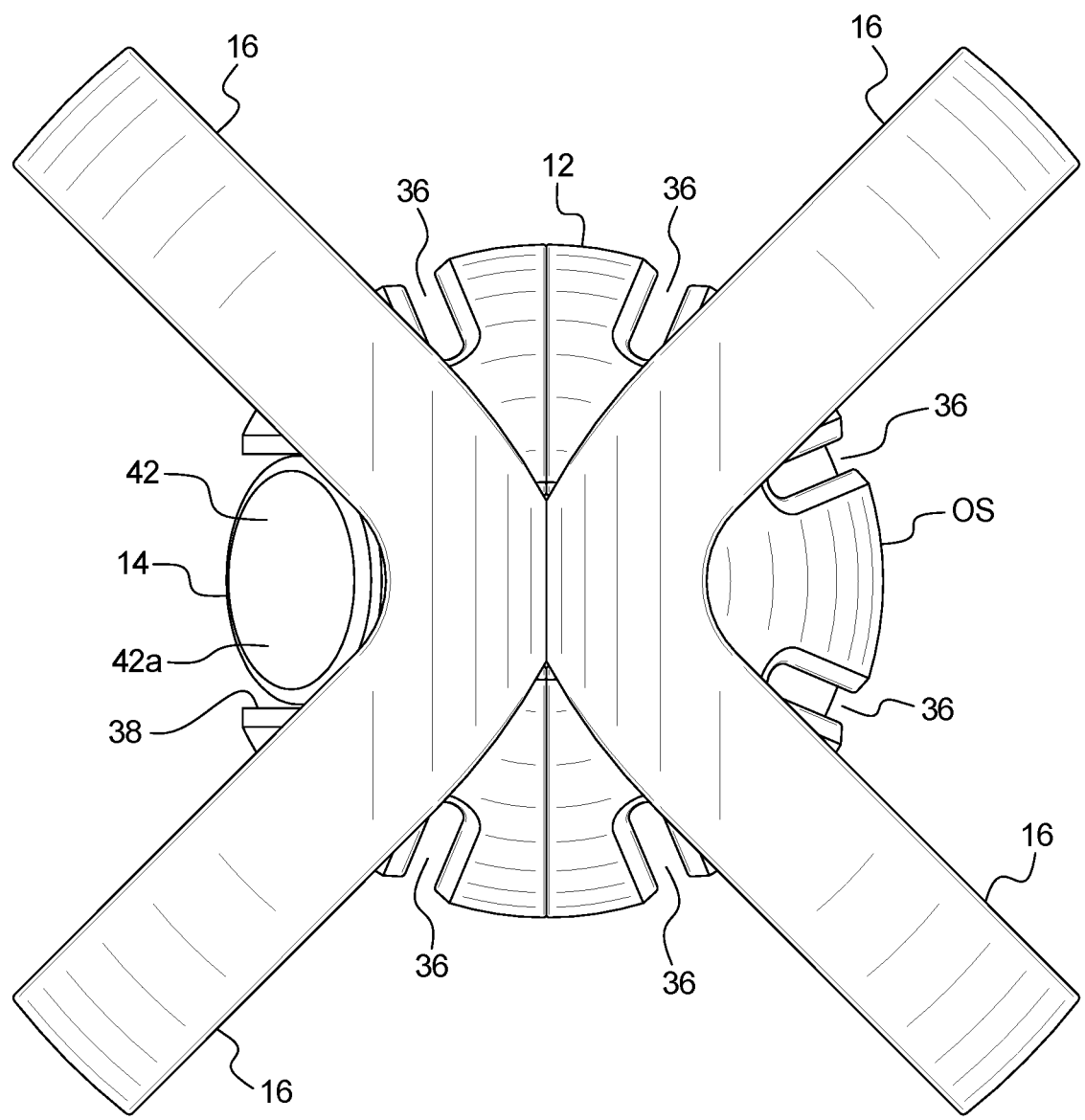
FIG. 3 is a rear view of the of the animal toy of FIG. 1.
Figure 4:
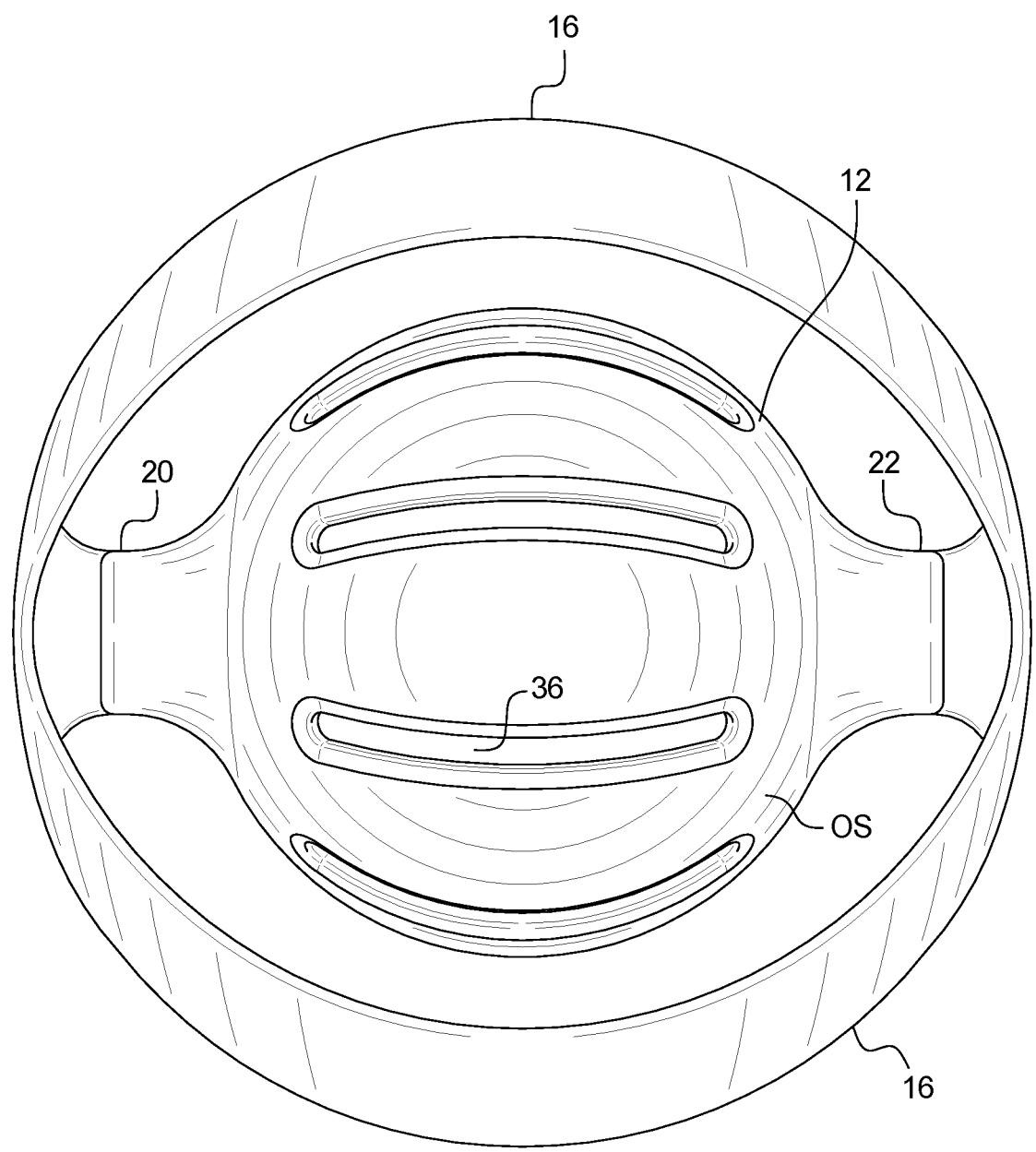
FIG. 4 is a first side view of the of the animal toy of FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to the FIGS. 1-4, a pet toy 10 is illustrated in accordance with a first embodiment. The pet toy 10 includes a generally spherical center portion 12, a slidable door 14 configured, and a plurality of flexible legs 16.

The generally spherical center portion 12 is preferably hollow defining an interior portion I or an inner space. The center portion 12 is also preferably molded plastic (e.g., translucent hard plastic) and can be formed of two generally equal in size portions (e.g., a first center portion 12a and a second center portion 12b) that are connected together. The first center portion 12a can be snap fit (friction fit) onto a protrusion or rib 18 on the second center portion 12b, or connected in a permanent or semi-permanent manner. For example, the first and second center portions 12a and 12b can be coupled together with an adhesive or screws or in any suitable manner.

Figure 6:
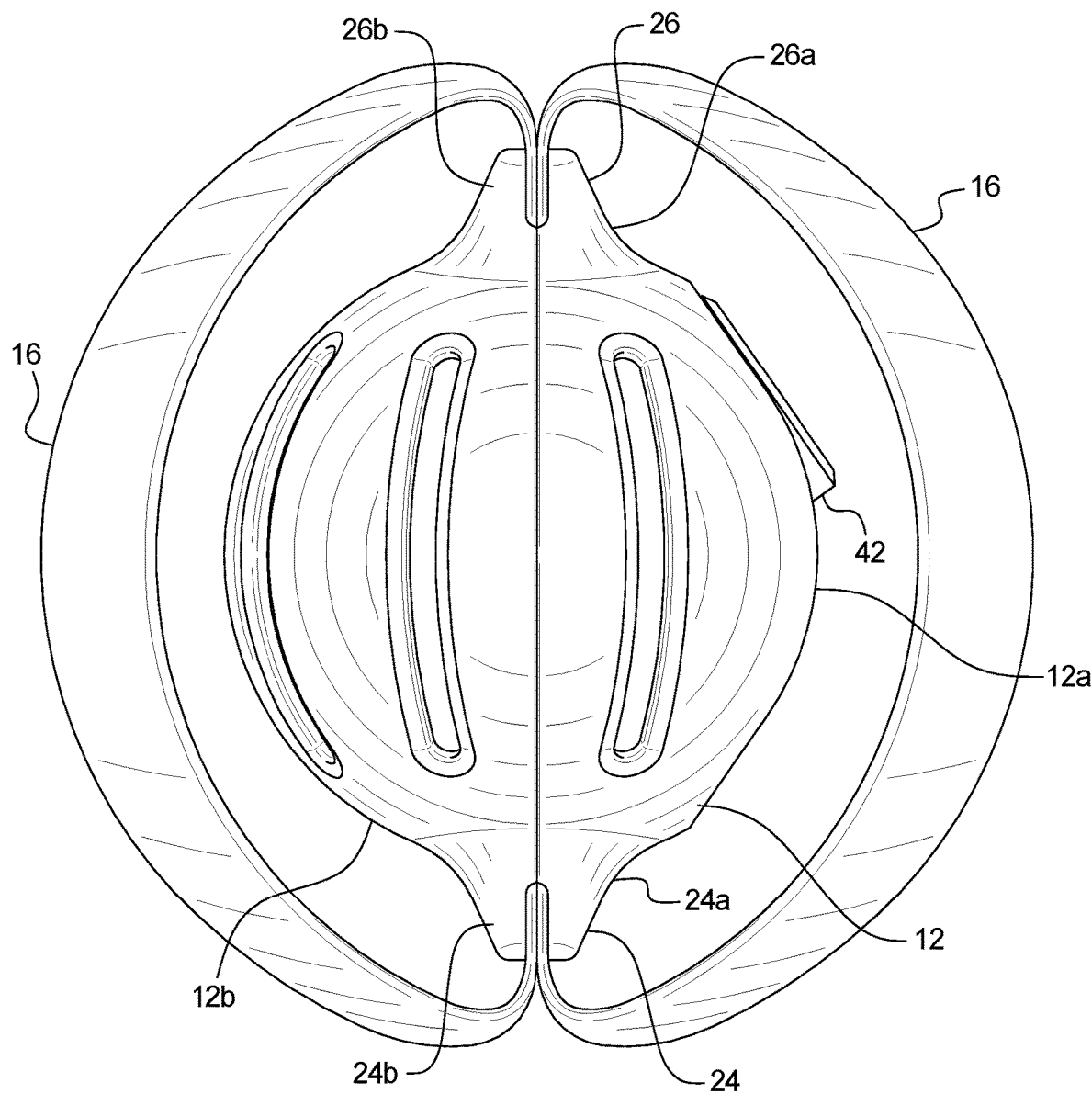
FIG. 6 is a top view of the of the animal toy of FIG. 1 with the door in an opened position.
Figure 7:
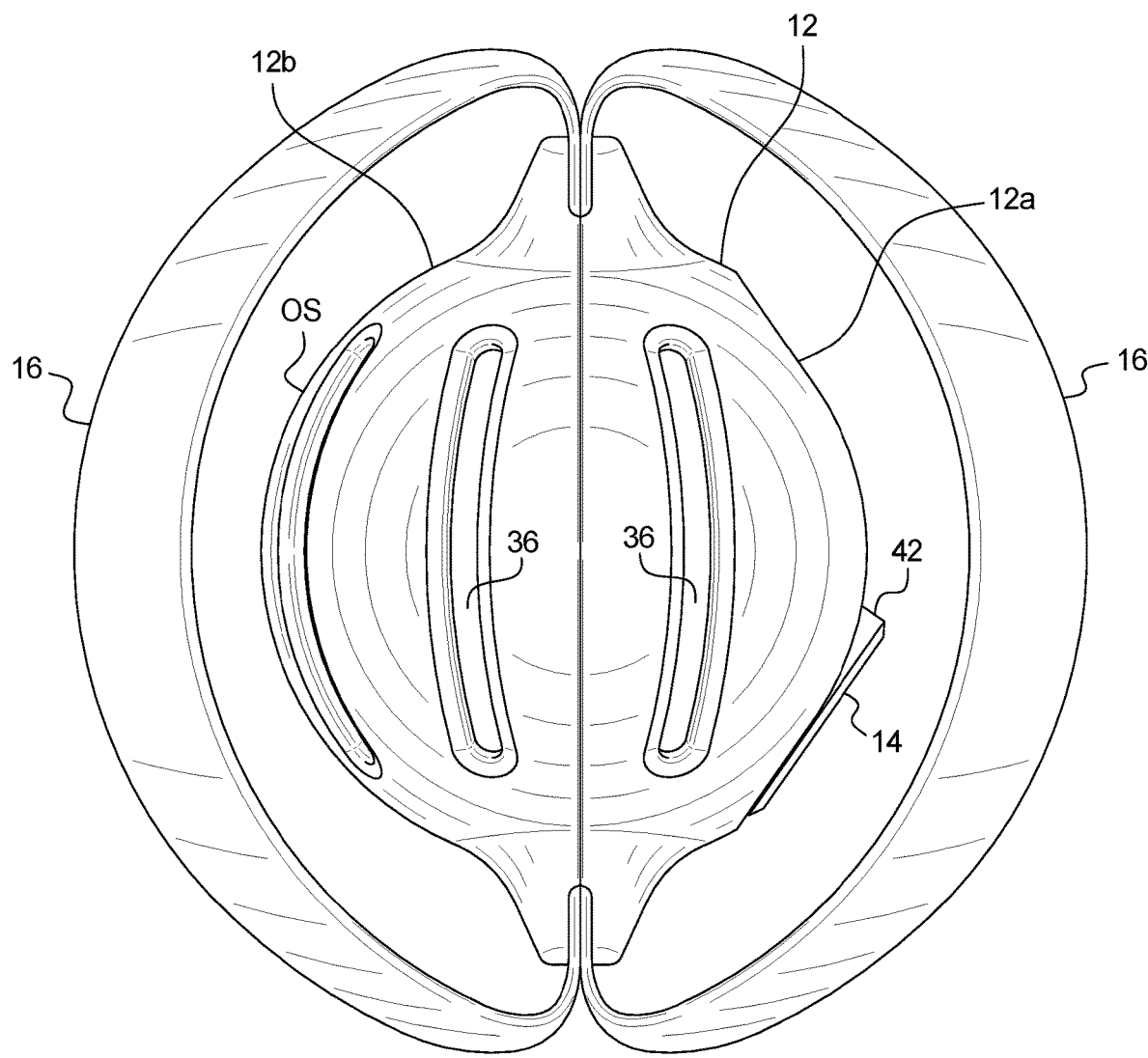
FIG. 7 is a top view of the of the animal toy of FIG. 1 with the door in a closed position.
Figure 8:
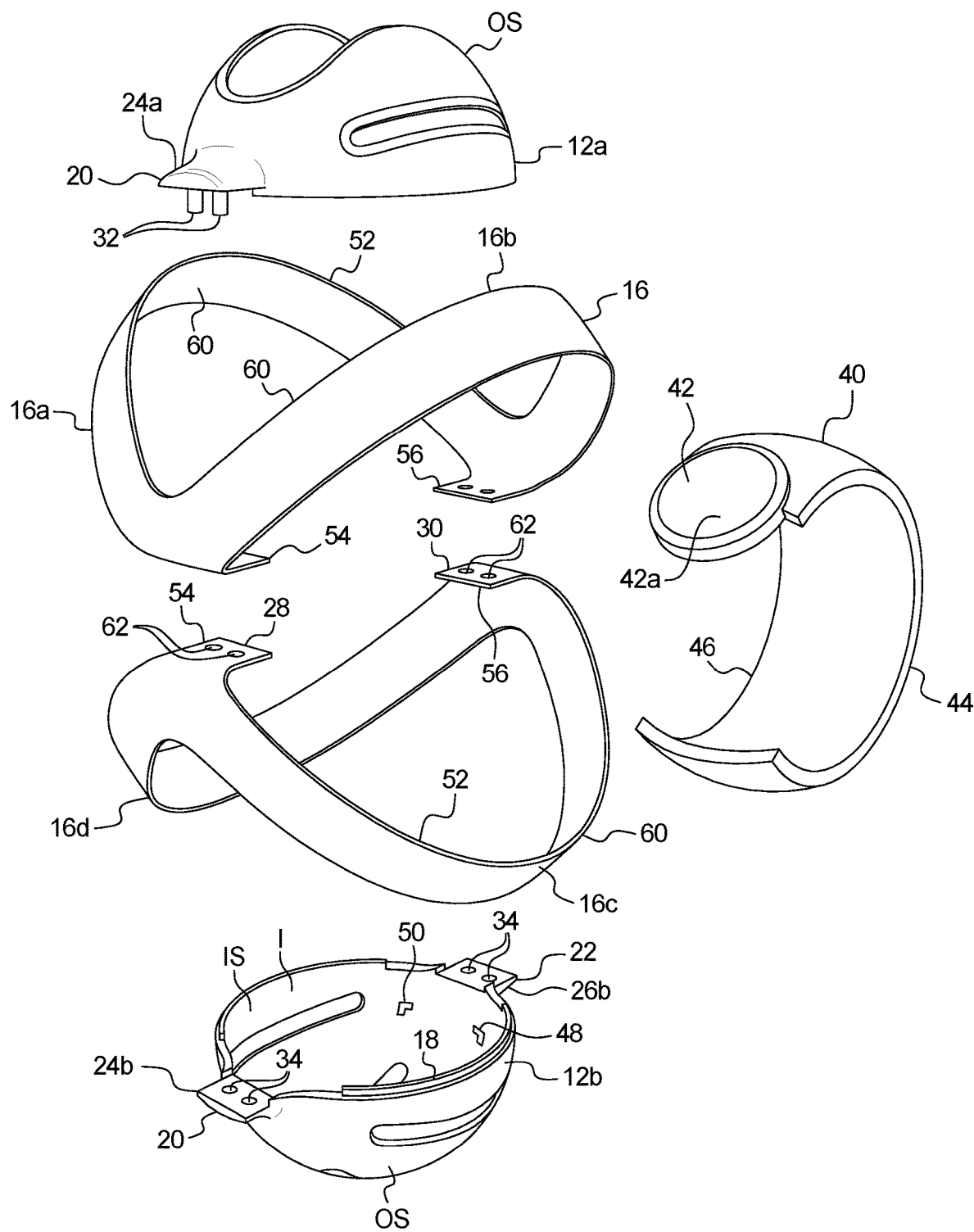
FIG. 8 is an exploded view of the animal toy of FIG. 1.

The center portion 12 has a first end 20 and a second end 22. The first and second ends 20 and 22 each include a generally rectangular connecting portion 24 and 26 configured to couple to the first and second ends 28 and 30 of the plurality of flexible legs 16. As shown in FIGS. 6-8, the first center portion 12a has a first connecting portion 24a and a second connecting portion 26a and the second center portion 12b has a first connecting portion 24b and a second connecting portion 26b. The first and second connecting portions 24a and 26a can include protrusions 32 extending from a surface thereof. The protrusions 32 correspond to openings 34 in the second connecting portions. Thus, when the first and second center portions 12a and 12b are coupled together, the protrusions 32 from the first and second connecting portions 24a and 26a are inserted or fit into the openings 34 in the first and second connecting portions 24b and 26b, respectively. The connecting portions 24 and 26 are capable of sandwiching or clamping the ends 28 and 30 of the flexible legs 16 to couple or affix the legs 16 to the center portion 12.

The center portion 12 can have a plurality of slots or openings 36 that extend in a longitudinal direction along the outer surface OS of the center portion 12. In one embodiment, the first center portion 12a has 2 slots 36 and the second center portion 12b has four slots. The slots 36 can be spaced equidistant around the exterior of the center portion 12. Moreover, the slots 36 enable access from the outside to an interior portion I of the center portion 12. These slots 36 are generally formed such that kibble or animal treats cannot pass therethrough. However, preferably the slots 36 are sized and configured such that the interior portion I of the center portion 12 and any kibble or objects disposed therein can be seen and/or smelled.

The center portion 12 has another opening 38 larger than the plurality of gaps or openings. This opening 38 extends generally in the same direction as the plurality of slots 36, but is sized and configured to enable kibble, treats or other objects to pass from the exterior of the center portion 12 to the interior portion I, or in the opposite direction. This opening 38 can have two arcuate or curved ends 38a and 38b and has generally straight sides 38c and 38d (in the plan view) connecting the curved ends.

The opening 38 can have a door 14 capable of closing the opening 38. The door 14 can be molded hard plastic with a matte finish. The door 14 has generally the same curve as the outer surface OS of the generally spherical center portion 12 so as to be generally flush or at least radially similar thereto. The door 14 can have a door sliding portion 40 and a generally circular opening member or button 42 with a recessed portion 42a. This button 42 allows a user to open and close the door 14 using a finger or thumb to slide the door 14 in the opening 38. As shown in FIGS. 6 and 7, in one embodiment, the button 42 can be positioned slightly above (or radially outside) the outer circumference of the center portion 12 to further enable ease of use.

The button 42 can be connected at one end of the door sliding portion 40. The sliding portion 40 is arcuate and can have the same radius of curvature as an interior surface IS of the center portion 12. The door sliding portion 40 is generally longer than the opening 38 into which the door 14 is inserted. For example, while the opening 38 may only extend between 90 degrees and 180 degrees around the outer surface OS of the center portion 12, the door sliding portion 40 can extend more than 180 degrees around the interior surface IS of the center portion 12 and the door sliding portion 40 and the button 42 in combination can extend more than 270 degrees around the center portion 12.

Figure 5:
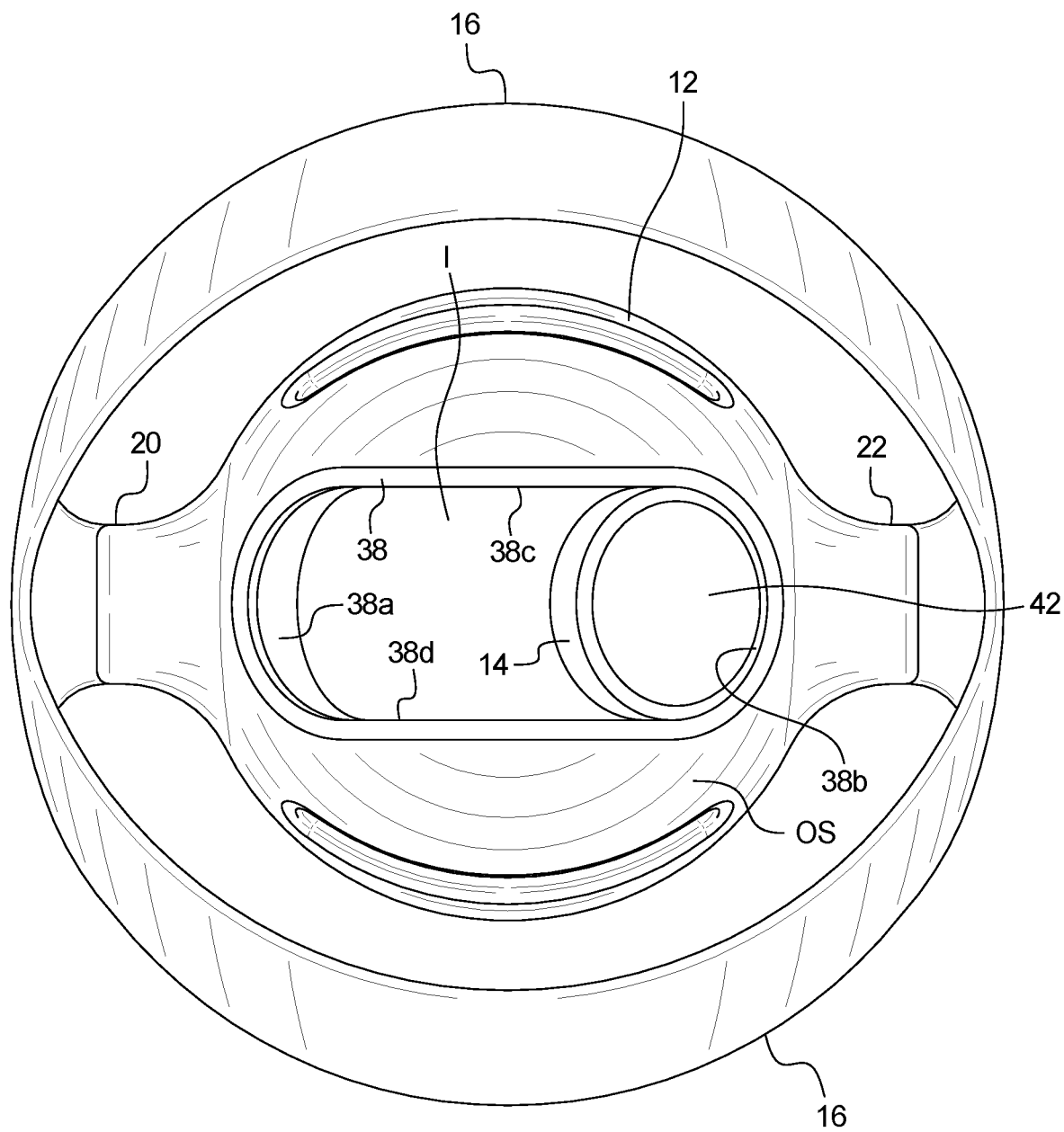
FIG. 5 is a second side view of the of the animal toy of FIG. 1 with the door in an opened position.

The door 14 can be inserted and positioned within the opening 38 in any suitable manner that enables to door 14 to slide within the opening 38. For example, the side edges 44 and 46 of the door 14 can be inserted into grooves or flanges 48 and 50 in the interior surface IS of the center portion 12 or in the opening 38 itself. Such a configuration would enable the door 14 to slide within the opening 38 such that the door 14 is capable of being in an open position (FIGS. 5 and 6), a closed position (FIG. 7) and a partially opened position.

The center portion 12 can have any suitable size but in one embodiment has a diameter of about 40 mm. As discussed above, the connecting portions of the center portion 12 thus each have first and second connecting portions 24 and 26, connected respectfully to the first and second center portions 12a and 12b. The first and second connecting portions 34 and 26 extend outwardly in a longitudinal direction from the outer surface OS of the center portions 12 and 12b. The first connecting portion 24a of the first center portion 12a (e.g., the portion having the kibble opening) can have protrusions 32 extending generally perpendicular therefrom that engage openings 34 in the first connecting portion 24b of the second center portion 12b. This connection can improve the connection to the plurality of legs 16.

The plurality of legs 16 are preferably flexible and springy and are formed of plastic with a matte finish. The legs 16 can form a generally an outer spherical shape having a generally constant diameter, or have an elliptical shape with differing diameters. In the elliptical embodiment, the legs 16 define a large diameter of about 80 mm and a small diameter of 63 mm. the distance from the end of one leg to an adjacent leg is preferably about 63 mm. However, it is noted that the dimensions of the legs 16 can be any suitable dimensions and the dimensions discussed herein are only exemplary.

The plurality of legs 16 can be four legs 16a, 16b, 16c and 16d with the four legs being formed from two separate pairs of legs (a first pair 16a and 16b and a second pair 16c and 16d). Each pair of legs 16 has a first leg (16a and 16c) and a second leg (16b and 16d) offset 90 degrees from the first leg (16a and 16c). Accordingly, the four legs are each positioned 90 degrees from each adjacent leg. The legs 16 are separated by a space therebetween that enables the animal access through and between the legs 16 to the center portion 12. The legs 16 can be sized and dimensioned in any manner that can restrict or enable access to the center portion 12. Moreover, since the legs 16 generally encircle the center portion 12 and are formed from a resilient, flexible material, when the toy 10 is dropped or moved at least one leg will contact a surface, protecting the center portion 12 and enabling a spring or bouncing action to entertain the animal. It is noted that there can be any number of desired legs 16 disposed in any position or suitable manner.

In one embodiment, in a pair of legs the two legs (e.g., 16a and 16b or 16c and 16d) are connected together to form a leg portion 52. Thus, the leg portion 52 includes a first leg (16a and 16c), a second leg (16b and 16d), a first end 54 and a second end 56. The first and second legs (e.g., 16a and 16b or 16c and 16d) meet and are each connected to the first and second ends 54 and 56. Each of the legs 16 includes an arcuate portion 60 so as to at least partially surround the generally spherical center portion 12. The arcuate portion 60 can have a generally rectangularly cross section with a predetermined width. The arcuate portion extends between the first end and the second end 54 and 56.

The first and second ends 54 and 56 extend in a longitudinal direction of the center portion 12 and have openings 62 therein. The openings receive the protrusions from the first connecting portion of the first center portion 12a to hold the legs 16 in position. The first and second ends 54 and 56 preferably extend inwardly and towards each other. The first and second ends 54 and 56 can be generally rectangular and have a shape and size similar to the connecting portions 24 and 26. As shown in FIGS. 7 and 8, the first and second ends 54 and 56, overlie each other and are sandwiched between the first and second ends 54 and 56 of the first and second center portions 12a and 12b.

The legs 16 are preferably flexible and resilient such that they are capable of bending and flexible so as to enable a springing action. Accordingly, as is understood, the weight of the toy 10 when moved or dropped will enable the legs 16 to compress or deform upon impact with a surface. The resiliency of the legs 16 will cause the legs 16 to return to the original configuration, causing the springing action and thus the toy 10 will bounce or move in response. This bouncing or movement can be unpredictable, increasing enjoyment of the toy 10 for an animal.

In operation, the door 14 on the center portion 12 is opened by sliding the button 42 along the opening 38, and kibble, treats or any other suitable object can be placed in the interior portion I or the center portion 12. In one embodiment, since the door 14 is disposed within the opening 38 with a friction fit, the door 14 can slide to the closed position or to a partially closed or partially opened position at any position along the opening 38. When the door 14 is in the opened position, only the button 42 is visible from the exterior. However, when the door 14 is in the closed position or in a partially closed position, at least a portion of the door sliding portion 44 is visible from the exterior blocking or closing the opening 38.

The animal attempting to obtain the object within the center portion 12 can smell the object through the plurality openings 36 but may have difficulty reaching the object since the door 14 is in the closed or partially closed (partially opened) position. The animal can play with the toy 10 in an attempt to obtain the object and the legs 16 can increase enjoyment for the animal alone (hitting the object with a paw) or with an owner/person throwing or moving the object for the animal.

Further, as the animal plays with the toy 10 and moves the toy 10, the legs 16 will spring and move the toy 10 in an unpredictable and irregular pattern. Moreover, the legs 16 can cause the toy 10 to spring or bounce of surfaces and walls increasing the animal's overall enjoyment of the toy 10. The legs 16 can also partially protect the center portion 12 from the animal's teeth. That is, the animal may not be able to directly bite the center portion 12, thus improving the longevity of the toy 10.

Further the door 14 can be partially opened or completely opened to enable easier access for the animal or closed to enable more difficult access to the interior or the center portion 12. As is understood, the door 14 is capable of sliding within the opening 38 to any desired position to open the opening to any desired amount.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An animal toy comprising:
   a generally spherical center portion having an opening, the center portion includes a first center portion and a second center portion coupled to the first center portion;
   a slidable door configured to close the opening, the slidable door configured to fit within the opening such that the door is capable of being in an open position, a closed position and a partially opened position; and
   a plurality of flexible legs, each of the legs including an arcuate portion so as to at least partially surround the generally spherical center portion, the slidable door being positioned radially inward of the flexible legs with respect to a center of the center portion, the plurality of flexible legs includes a first part that has a pair of the flexible legs and a second part having another pair of the flexible legs, the first part being attached to the first center portion and the second part being attached to the second center portion.

2. The animal toy of claim 1, wherein
the first center portion includes a first connecting portion with a protrusion and the second center portion includes a second connection portion with second opening and the protrusion is configured to fit within the opening of the second connecting portion.

3. The animal toy of claim 1, wherein
the center portion includes a plurality of slots.

4. The animal toy of claim 1, wherein
each of the plurality of flexible legs is resilient.

5. The animal toy of claim 1, wherein
the door includes a sliding portion and an opening member.

6. The animal toy of claim 5, wherein
the sliding portion is arcuate and has generally the same radius of curvature as an interior surface of the center portion.

7. The animal toy of claim 5, wherein
the sliding portion is longer than the opening.

8. The animal toy of claim 5, wherein
sliding portion extends more than 180 degrees around the interior surface of the center portion.

9. The animal toy of claim 1, wherein
the slidable door extend more than 270 degrees around the center portion.

10. The animal toy of claim 1, wherein
the plurality of flexible legs includes four flexible legs evenly spaced around the center portion.

11. The animal toy of claim 1, wherein
each of the plurality of flexible legs is attached to a first end and a second end of the center portion.

12. The animal toy of claim 1, wherein
the first and second parts of the plurality of flexible legs being connected at an end of the plurality of flexible legs, the end having another opening therein.

13. The animal toy of claim 12, wherein
the first center portion includes a first connecting portion with a protrusion and the second center portion includes a second connection portion with a corresponding opening and the protrusion is configured to pass through the another opening in the end of the plurality of flexible legs and fit within the corresponding opening of the second connecting portion.

14. The animal toy of claim 13, wherein
the end is configured to be disposed between a surface of the first connecting portion and a surface of the second connecting portion.

15. The animal toy of claim 1, wherein
the slidable door moves in a circumferential direction along the center portion with respect to the center of the center portion.

16. The animal toy of claim 1, wherein
the first and second parts of the plurality of flexible legs being detachably connected to each other.

17. The animal toy of claim 16, wherein
the first and second parts are detachably connected to the center portion.

* * * * *